(12) United States Patent
Strait et al.

(10) Patent No.: US 10,544,804 B2
(45) Date of Patent: Jan. 28, 2020

(54) BOSS THERMAL SEAL

(71) Applicant: United Technologies Corporation, Farmington, CT (US)

(72) Inventors: Mathieu Strait, Rocky Hill, CT (US); Mainul Islam, Bolton, CT (US)

(73) Assignee: United Technologies Corporation, Farmington, CT (US)

( * ) Notice: Subject to any disclaimer, the term of this patent is extended or adjusted under 35 U.S.C. 154(b) by 641 days.

(21) Appl. No.: 15/200,539

(22) Filed: Jul. 1, 2016

(65) Prior Publication Data
US 2018/0003194 A1    Jan. 4, 2018

(51) Int. Cl.
| F04D 29/58 | (2006.01) |
| B32B 7/12 | (2006.01) |
| B32B 15/14 | (2006.01) |
| F04D 29/42 | (2006.01) |

(52) U.S. Cl.
CPC ............ *F04D 29/5853* (2013.01); *B32B 7/12* (2013.01); *B32B 15/14* (2013.01); *F04D 29/4226* (2013.01); *B32B 2581/00* (2013.01)

(58) Field of Classification Search
CPC ...... F01D 25/243; F01D 25/28; F01D 25/145; F04D 29/5853; F04D 29/4226; F16J 15/104; F16J 15/065; F16J 15/122; F16B 43/001
See application file for complete search history.

(56) References Cited

U.S. PATENT DOCUMENTS

| 1,788,041 A | | 1/1931 | Balfe | |
| 1,823,341 A | * | 9/1931 | Victor | F16J 15/122 |
| | | | | 277/348 |
| 3,595,589 A | * | 7/1971 | Henderson | F16J 15/123 |
| | | | | 277/601 |
| 3,924,863 A | | 12/1975 | Nakano et al. | |
| 4,072,316 A | * | 2/1978 | Decker | F02M 19/00 |
| | | | | 277/597 |

(Continued)

FOREIGN PATENT DOCUMENTS

| DE | 18689 | 7/1882 |
| DE | 19822489 | 11/1998 |

(Continued)

OTHER PUBLICATIONS

Extended European Search Report dated Dec. 22, 2107 in European Application No. 17179422.5.

*Primary Examiner* — Brian P Wolcott
(74) *Attorney, Agent, or Firm* — Snell & Wilmer, L.L.P.

(57) ABSTRACT

Systems and methods for thermal seals are described herein. A thermal seal may comprise a first metallic plate having a first inner surface and a first outer surface, a second metallic plate having a second inner surface and a second outer surface, the second metallic plate being oriented substantially parallel to the first metallic plate such that the first inner surface and the second inner surface are separated by a gap, and a thermal wool having a plate portion in contact with the first inner surface and the second inner surface, the plate portion filling a void between the first inner surface and the second inner surface, and having a shoulder portion extending from a perimeter of the plate portion, the shoulder portion extending outward from between the first metallic plate and the second metallic plate.

20 Claims, 6 Drawing Sheets

(56) References Cited

U.S. PATENT DOCUMENTS

| | | | | |
|---|---|---|---|---|
| 4,961,588 A | * | 10/1990 | Brienza | F16J 15/3204 |
| | | | | 277/545 |
| 8,672,609 B2 | * | 3/2014 | Lussier | F01D 21/045 |
| | | | | 415/197 |
| 9,982,605 B2 | * | 5/2018 | Robertson | F01D 21/045 |
| 2016/0069620 A1 | | 3/2016 | Kennedy | |
| 2019/0283860 A1 | * | 9/2019 | Chopard | B32B 3/06 |

FOREIGN PATENT DOCUMENTS

| | | | | |
|---|---|---|---|---|
| EP | 1389691 | | 2/2004 | |
| EP | 2474712 | | 7/2012 | |
| EP | 2977589 | | 1/2016 | |
| JP | H06219827 | | 8/1994 | |
| JP | 2002257240 | | 9/2002 | |
| WO | WO-2009087172 A2 | * | 7/2009 | B29C 70/66 |

\* cited by examiner

BOSS THERMAL SEAL

FIELD

This disclosure relates generally to gas turbine engines, and more particularly to thermally insulating connections.

BACKGROUND

Gas turbine engines generally incorporate a fan case within which a fan rotates. Various components may be attached to a distal surface of the fan case. Such components may include ducts for directing the flow of hot gases, from a compressor section of the gas turbine engine for example. Composite fan cases may have temperature restrictions for components anchored to the fan case.

SUMMARY

Systems and methods for thermal seals are described herein, in accordance with various embodiments. A thermal seal may comprise a first metallic plate having a first inner surface and a first outer surface, a second metallic plate having a second inner surface and a second outer surface, the second metallic plate being oriented substantially parallel to the first metallic plate such that the first inner surface and the second inner surface are separated by a gap, and a thermal wool having a plate portion in contact with the first inner surface and the second inner surface, the plate portion filling a void between the first inner surface and the second inner surface, and having a shoulder portion extending from a perimeter of the plate portion, the shoulder portion extending outward from between the first metallic plate and the second metallic plate.

In various embodiments, the shoulder portion may bend in a direction perpendicular to the plate portion, the shoulder portion configured to thermally seal at least a portion of an adjacent component. An aperture may be disposed in the thermal seal, the aperture having a centerline axis being substantially perpendicular to the first metallic plate and the second metallic plate. The thermal wool may comprise a high temperature mineral wool insulation. The thermal wool may comprise a semi-rigid sheet. The first metallic plate and the second metallic plate comprise aluminum. The first metallic plate may be coupled to the thermal wool via an adhesive and the second metallic plate may be coupled to the thermal wool via the adhesive. A width of the plate portion may be substantially equal to a width of the first metallic plate and a length of the plate portion is substantially equal to a length of the first metallic plate. A thickness of the thermal wool may be between 100% and 2,000% of a thickness of the first metallic plate.

A fan case arrangement may comprise a composite fan case, a composite member coupled to the composite fan case, a duct for directing a hot fluid, and a thermal seal. The thermal seal may comprise a first metallic plate, a second metallic plate, and a thermal wool comprising a plate portion and a shoulder portion, the plate portion being located between the first metallic plate and the second metallic plate, the shoulder portion extending from a perimeter of the plate portion and being in contact with the composite member, the shoulder portion extending from between the first metallic plate and the second metallic plate, wherein the thermal seal is coupled between the composite member and the duct.

In various embodiments, the first metallic plate may have a first inner surface and a first outer surface, the second metallic plate may have a second inner surface and a second outer surface, the second metallic plate being oriented substantially parallel to the first metallic plate such that the first inner surface and the second inner surface are separated by a gap, and the thermal wool may be in contact with the first inner surface and the second inner surface, the thermal wool filling a void between the first inner surface and the second inner surface. A thermal communication between the first metallic plate and the second metallic plate may be minimized via the thermal wool. The first metallic plate may be in thermal communication with the duct and the second metallic plate may be in thermal communication with the composite member. A first aperture may be disposed in the thermal seal, the first aperture having a first centerline axis being substantially perpendicular to the first metallic plate and the second metallic plate and a second aperture is disposed in the thermal seal, the second aperture having a second centerline axis being substantially perpendicular to the first metallic plate and the second metallic plate. The fan case arrangement may further comprise an attachment feature for attaching the duct to the composite member, the attachment feature being coupled between the duct and the thermal seal. A fastener may be located at least partially within at least one of the first aperture or the second aperture to fasten the duct to the composite member. The composite member may comprise a fan case boss.

A method for thermally insulating a high temperature member from a composite member may comprise coupling a first metallic plate to a thermal wool, the thermal wool comprising a plate portion and a shoulder portion, coupling a second metallic plate to the plate portion of the thermal wool to form a thermal seal, the shoulder portion extending from a perimeter of the plate portion and also extending from between the first metallic plate and the second metallic plate, coupling the high temperature member to the first metallic plate, and coupling the composite member to the second metallic plate and to the shoulder portion of the thermal wool.

In various embodiments, the coupling the composite member to the shoulder portion may include at least partially enclosing a portion of the composite member wherein the second metallic plate is located. The coupling the second metallic plate to the thermal wool may comprise coupling the second metallic plate to a second surface of the thermal wool, the first metallic plate being coupled to a first surface of the thermal wool, the first surface and the second surface being located on opposite sides of the thermal wool.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
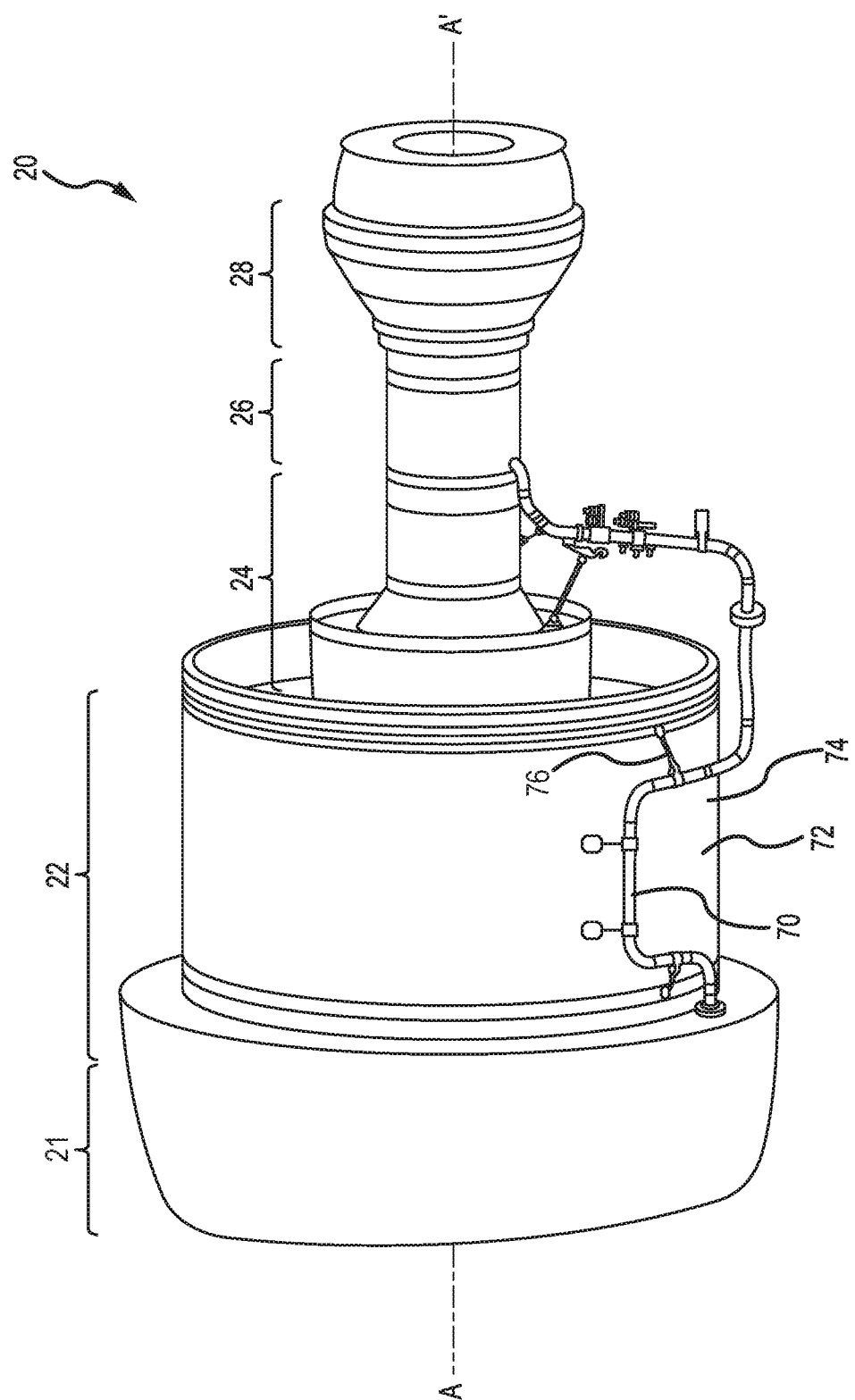
FIG. 1 illustrates an example gas turbine engine having a hot duct, in accordance with various embodiments.

In various embodiments and with reference to FIG. 1, a gas turbine engine 20 is provided. Gas turbine engine 20 may be a two-spool turbofan that generally incorporates an inlet section 21, a fan section 22, a compressor section 24, a combustor section 26 and a turbine section 28. Alternative engines may include, for example, an augmenter section among other systems or features. In operation, fan section 22 can drive air along a bypass flow-path while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of gas turbine engines including three-spool architectures.

In various embodiments, fan section 22 may include fan case (also referred to herein as composite fan case) 74. Fan case 74 may comprise a composite structure. A duct, such as duct 70, may be coupled to a distal surface, i.e., surface 72, of fan case 74. In various embodiments, duct 70 may be coupled to fan case 74 via an attachment feature 76. Duct 70 may supply a high temperature fluid to various sections of engine 20. For example, duct 70 may supply air from compressor section 24 to inlet section 21 for de-icing purposes. Air from compressor section 24 may reach temperatures of up to 1,200° F. or more.

Figure 2:
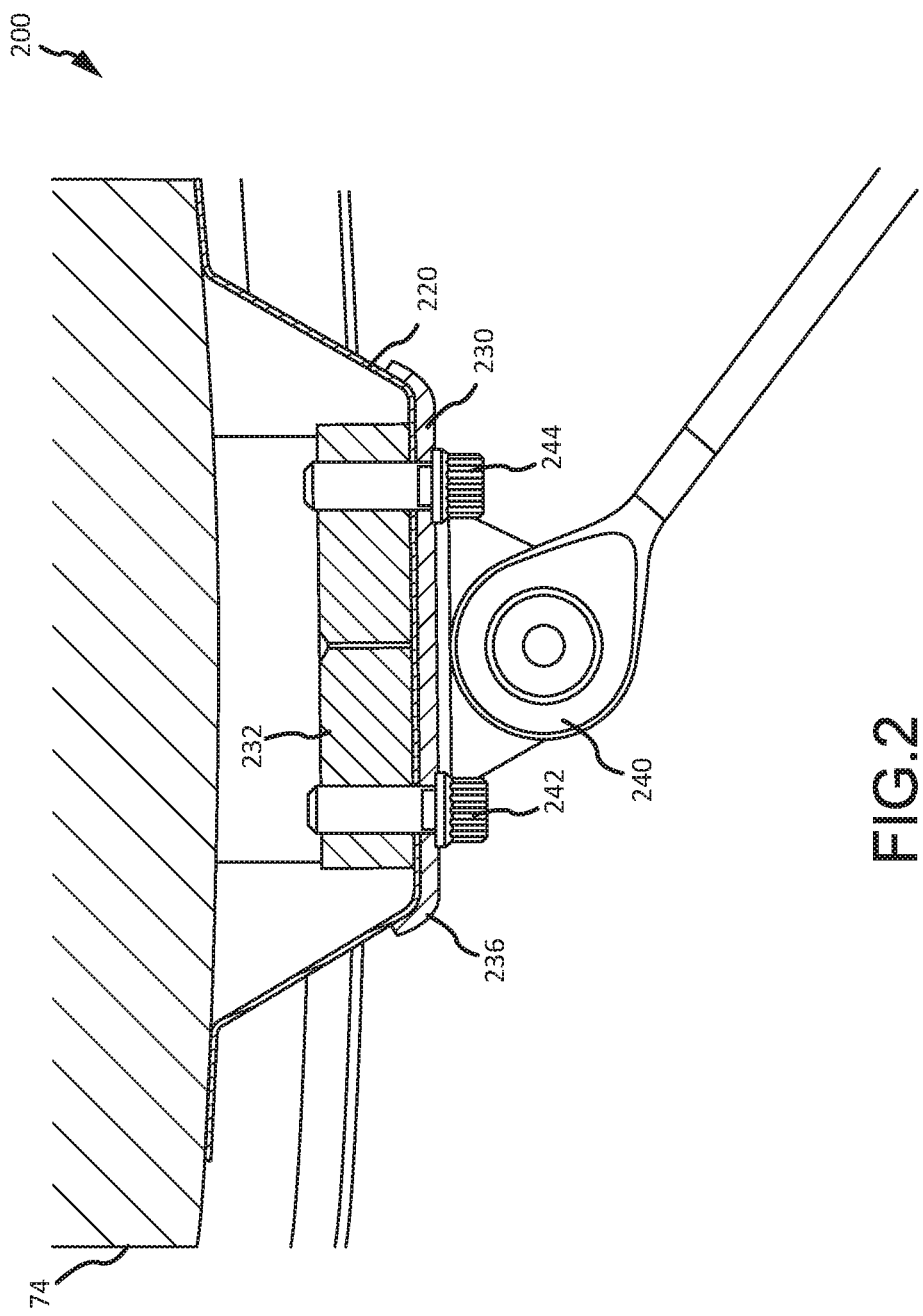
FIG. 2 illustrates a cross-section view of a fan case arrangement, in accordance with various embodiments.

With respect to FIG. 2, elements with like element numbering, as depicted in FIG. 1, are intended to be the same and will not necessarily be repeated for the sake of clarity.

With reference to FIG. 2, a cross-section view of fan case arrangement 200 is illustrated, in accordance with various embodiments. Fan case arrangement 200 may comprise fan case 74, composite member 220, and thermal seal 230. In various embodiments, fan case arrangement 200 may further comprise attachment feature 240. Attachment feature 240 may be for attaching or otherwise coupling duct 70 (see FIG. 1) to composite member 220. Attachment feature 240 may be similar to attachment feature 76 (see FIG. 1). Composite member 220 may comprise and/or be referred to as a fan case boss. Composite member 220 may generally comprise a geometry similar to that of an isosceles trapezoid, as illustrated in FIG. 2. Composite member 220 may be coupled to fan case 74. Composite member 220 may extend radially outward from fan case 74.

Thermal seal 230 may be located between attachment feature 240 and composite member 220. Thermal seal 230 may comprise a shoulder 236. The geometry of shoulder 236 may be complimentary to the geometry of composite member 220. In this regard, shoulder 236 may partially enclose composite member 220. With momentary reference to FIG. 1, thermal seal 230 may be for minimizing thermal communication between attachment feature 240 and/or duct 70. Stated another way, thermal seal 230 may prevent heat from being transferred from attachment feature 240 and/or duct 70 to composite member 220 and/or fan case 74. Thermal seal 230 may thus minimize conductive heat transfer.

Figure 3A:
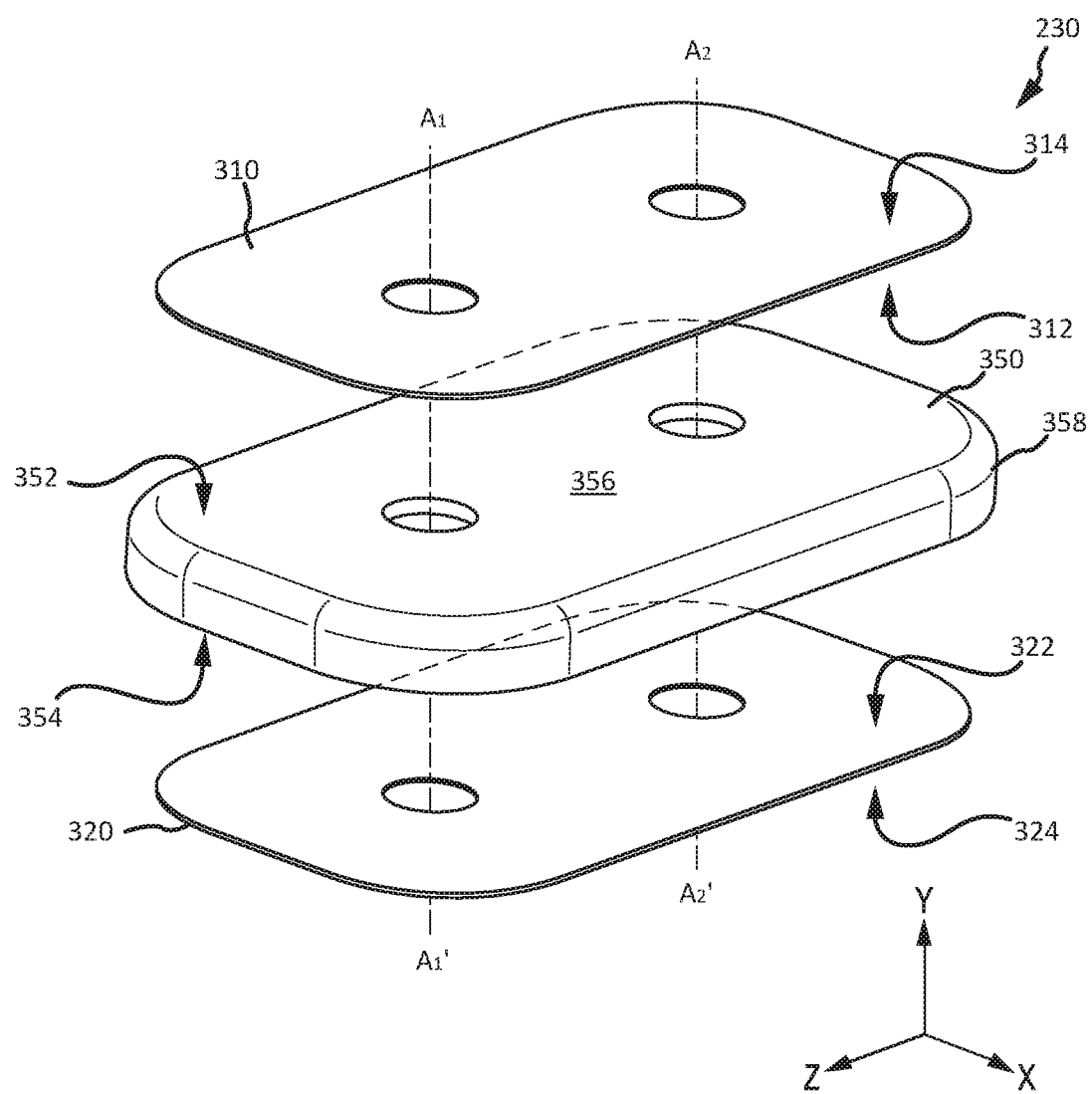
FIG. 3A illustrates an exploded view of a thermal seal, in accordance with various embodiments.
Figure 3B:
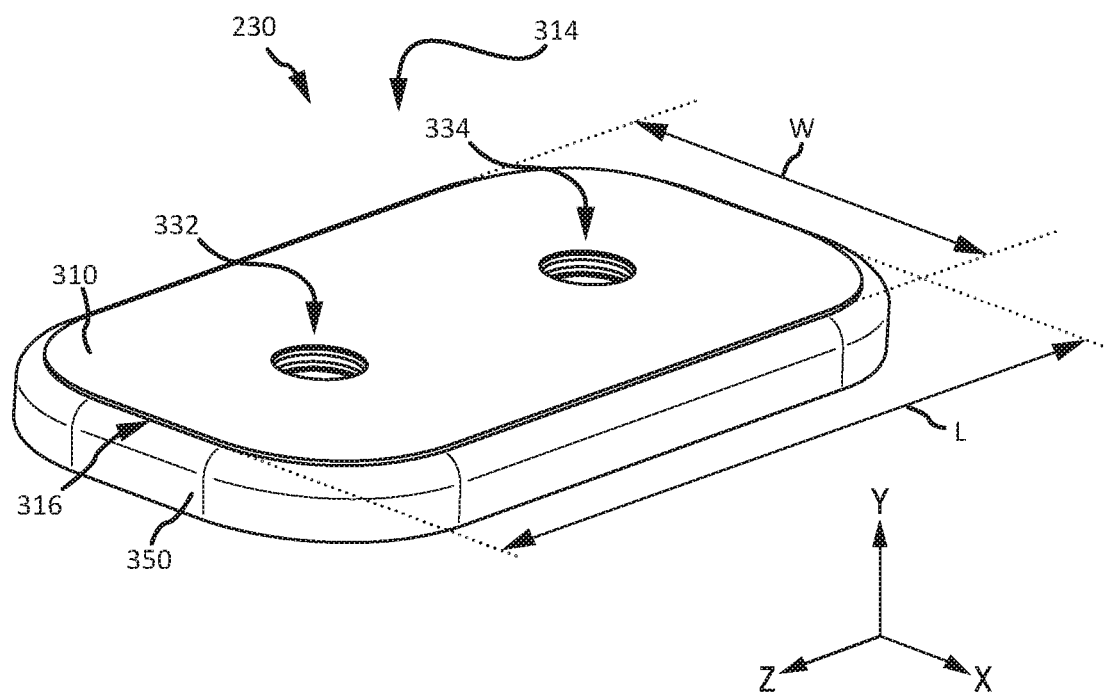
FIGS. 3B and 3C illustrate perspective views of a thermal seal, in accordance with various embodiments.

With combined reference to FIG. 2 and FIG. 3B, thermal seal 230 and attachment feature 240 may be coupled to composite member 220 via a first fastener 242 and a second fastener 244. In this regard, thermal seal 230 may comprise a first aperture 332 for receiving first fastener 242 and a second aperture 334 for receiving second fastener 244. In various embodiments, first fastener 242 may comprise a bolt or the like. Second fastener 244 may be similar to first fastener 242. First fastener 242 and second fastener 244 may be for coupling duct 70 (see FIG. 1) to composite member 220. An insert 232 may be coupled to composite member 220 for accepting first fastener 242 and second fastener 244. First fastener 242 and second fastener 244 may threadingly engage with insert 232. In this regard, insert 232 may couple composite member 220 via fasteners (i.e., first fastener 242 and second fastener 244).

With reference to FIG. 3A and FIG. 3B, an exploded view of thermal seal 230 is illustrated, in accordance with various embodiments. Xyz-axes are provided for ease of illustration. Thermal seal 230 may comprise a first metallic plate 310, a second metallic plate 320, and a thermal wool 350. In various embodiments, thermal wool 350 may comprise a semi-rigid sheet. In various embodiments, first metallic plate 310 and second metallic plate 320 may comprise aluminum.

Thermal wool 350 may comprise a plate portion 356 and a shoulder portion 358. Shoulder portion 358 may be similar to shoulder 236 (see FIG. 2). Plate portion 356 may be located between first metallic plate 310 and second metallic plate 320. Shoulder portion 358 may span the perimeter of plate portion 356. Shoulder portion 358 may extend from plate portion 356. Shoulder portion 358 may extend from between first metallic plate 310 and second metallic plate 320. Shoulder portion 358 may extend outward from outer side 316 of first metallic plate 310. Shoulder portion 358 may bend in a direction perpendicular to plate portion 356 (negative y-direction in FIG. 3A). Shoulder portion 358 may bend approximately ninety degrees (90°). Shoulder portion 358 may extend beyond first metallic plate 310 and second metallic plate 320, in the z-direction and in the x-direction. Shoulder portion 358 may comprise a chamfer edge, rounded edge, bullnose, or any other suitable edge.

First metallic plate 310 may comprise an inner surface (also referred to herein as a first inner surface) 312 and an outer surface (also referred to herein as a first outer surface) 314. Second metallic plate 320 may comprise an inner surface (also referred to herein as a second inner surface) 322 and an outer surface (also referred to herein as a second outer surface) 324. First metallic plate 310 may be oriented substantially parallel to second metallic plate 320. Inner surface 312 and inner surface 322 may be separated by a gap, in the y-direction. Thermal wool 350 may occupy the void defined by said gap. Stated another way, thermal wool 350 may be located between first metallic plate 310 and second metallic plate 320. Thermal wool 350 may be in contact with inner surface 312 and inner surface 322. In various embodiments, thermal wool 350 is in contact with the entire inner surface 312 and the entire inner surface 322, though in various embodiments, thermal wool 350 is in contact with only a portion of inner surface 312 and only a portion of inner surface 322. Plate portion 356 may comprise a first surface 352 and a second surface 354. First surface 352 may be in contact with inner surface 312. Second surface 354 may be in contact with inner surface 322. Thermal wool 350 may be configured to minimize heat transfer between first metallic plate 310 and second metallic plate 320. Stated another way, thermal communication between first metallic plate 310 and second metallic plate 320 may be minimized via thermal wool 350. In this regard, thermal wool 350 may comprise a high temperature mineral wool insulation material, or any other high temperature insulating material.

Inner surface 312 may be the same size as inner surface 322. Stated another way, the geometry of inner surface 312 may be similar to the geometry of inner surface 322. Stated yet another way, the surface area of inner surface 312 may be similar to the surface area of inner surface 322. Similarly, first surface 352 and inner surface 312 may comprise similar surface areas. Furthermore, second surface 354 and inner surface 322 may comprise similar surface areas. In this regard, the geometry of inner surface 312, first surface 352, second surface 354, and inner surface 322 may be similar. In this manner, the edge of first metallic plate 310 and the edge of second metallic plate 320 may be flush relative to one another. Stated another way, first metallic plate 310 may be aligned with second metallic plate 320, in the y-direction.

Figure 3C:
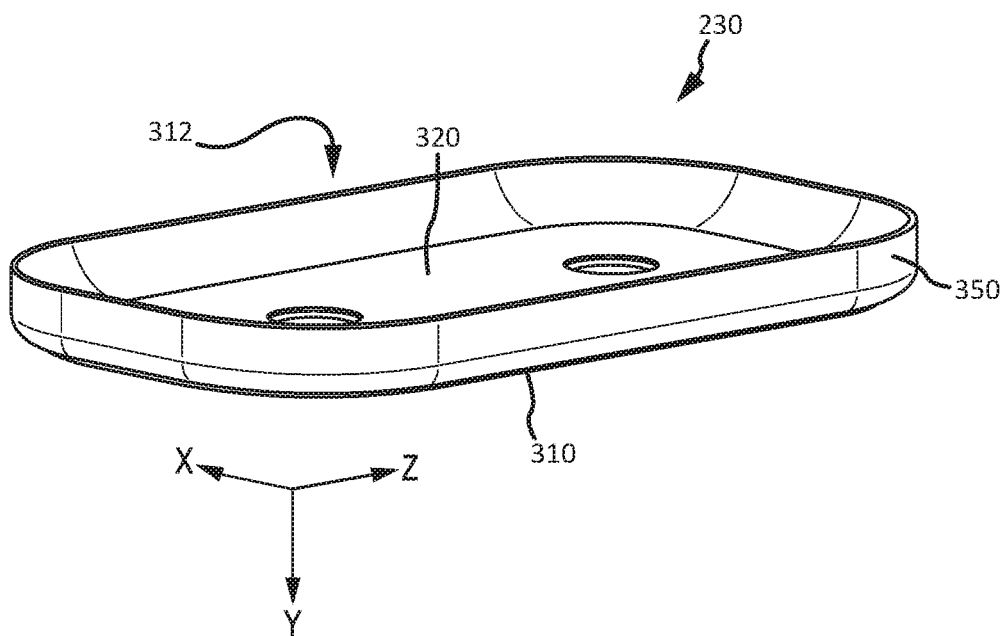

With reference to FIGS. 3B and 3C, perspective views of outer surface 314 and inner surface 312, respectively, of thermal seal 230 are illustrated, in accordance with various embodiments. A first aperture 332 may be disposed in thermal seal 230. First aperture 332 may extend through first metallic plate 310, second metallic plate 320, and thermal wool 350. With additional reference to FIG. 3A, first aperture 332 may have a first centerline axis $A_1$-$A_1'$ being substantially perpendicular to first metallic plate 310 and, similarly, perpendicular to second metallic plate 320. A second aperture 334 may be disposed in thermal seal 230. Second aperture 334 may extend through first metallic plate 310, second metallic plate 320, and thermal wool 350. Second aperture 334 may have a second centerline axis $A_2$-$A_2'$ being substantially perpendicular to first metallic plate 310 and, similarly, perpendicular to second metallic plate 320. With momentary reference to FIG. 2, first fastener 242 may be located at least partially within first aperture 332. Second fastener 244 may be located at least partially within second aperture 334. In this regard, thermal wool 350 may be held to first plate 310 and second plate 320 via friction, in accordance with various embodiments. For example, thermal wool 350 may be compressed between first plate 310 and second plate 320. Thermal wool 350 may be compressed between first plate 310 and second plate 320 in response to at least one of first fastener 242 (see FIG. 2) or second fastener 244 (see FIG. 2) being tightened.

In various embodiments, with reference to FIG. 3A and FIG. 3B, first metallic plate 310, second metallic plate 320, and plate portion 356 may comprise similar geometries. First metallic plate 310, second metallic plate 320, and plate portion 356 may comprise similar widths. First metallic plate 310, second metallic plate 320, and plate portion 356 may comprise a width W. First metallic plate 310, second metallic plate 320, and plate portion 356 may comprise similar lengths. First metallic plate 310, second metallic plate 320, and plate portion 356 may comprise a length L. First metallic plate 310, second metallic plate 320, and plate portion 356 may comprise a rectangular geometry. First metallic plate 310, second metallic plate 320, and plate portion 356 may comprise rounded corners as illustrated in FIG. 3B.

First metallic plate 310 may comprise a thickness (as measured in the y-direction in FIG. 3A). Second metallic plate may comprise a thickness (as measured in the y-direction in FIG. 3A). The thickness of first metallic plate 310 may be similar to the thickness of second metallic plate 320. Plate portion 356 of thermal wool 350 may comprise a thickness (as measured in the y-direction in FIG. 3A). In various embodiments, the thickness of plate portion 356 may be greater than the thickness of first metallic plate 310. In various embodiments, the thickness of plate portion 356 may be between 100% and 2,000% of the thickness of first metallic plate 310. In various embodiments, the thickness of plate portion 356 may be between 400% and 1,000% of the thickness of first metallic plate 310.

With reference to FIG. 1, FIG. 2, and FIG. 3A, first metallic plate 310 may be in contact with duct 70, via an attachment feature (i.e., attachment feature 240). Thus, first metallic plate 310 may be in thermal communication with duct 70, via an attachment feature (i.e., attachment feature 240), such that heat may be transferred conductively there between. Second metallic plate 320 may contact composite member 220. Thus, second metallic plate 320 may be in thermal communication with composite member 220, such that heat may be transferred conductively there between.

Figure 4:
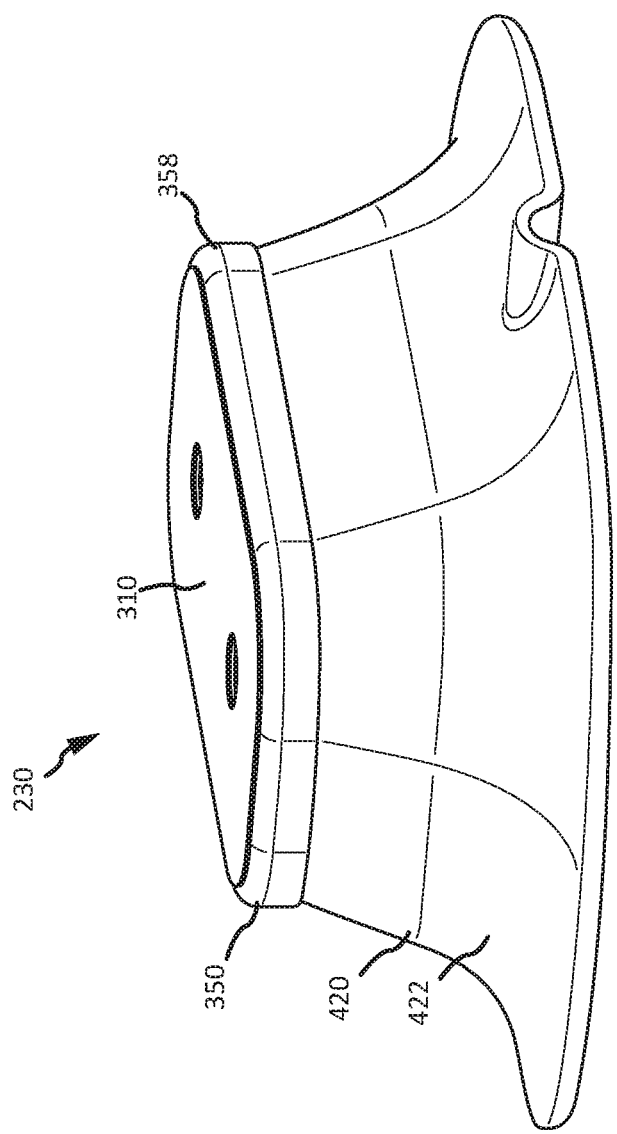
FIG. 4 illustrates perspective view of a thermal seal coupled to a fan case boss, in accordance with various embodiments.

With reference to FIG. 4, a thermal seal 230 coupled to a composite member 420, is illustrated, in accordance with various embodiments. Composite member 420 may be similar to composite member 220 (see FIG. 2). Composite member 420 may comprise an outer surface 422. Shoulder portion 358 of thermal wool 350 may bend over outer surface 422. In this manner, thermal wool 350 may generate a thermal seal around the portion of outer surface 422, wherein second metallic plate 320 (see FIG. 3A) is located (not visible in FIG. 4). In this regard, a thermally insulating barrier, created by thermal wool 350, encloses second metallic plate 320 (see FIG. 3A). Stated another way, shoulder portion 358 may be configured to thermally seal at least a portion of an adjacent component (i.e., composite member 420). In various embodiments, shoulder portion 358 may define an air pocket, wherein second metallic plate 320 (see FIG. 3A) is located. Shoulder portion 358 may prevent heat from radiating from first metallic plate 310 to second metallic plate 320 (see FIG. 3A) and/or composite member 420. In various embodiments, shoulder portion 358 of thermal wool 350 may follow the contour of outer surface 422. Shoulder portion 358 of thermal wool 350 may contact outer surface 422. In various embodiments, shoulder portion 358 of thermal wool 350 may be coupled to composite member 420, via an adhesive for example. However, shoulder portion 358 may rest against composite member 420 without the use of adhesive, in accordance with various embodiments.

In various embodiments, shoulder portion 358 may aide during assembly of fan case arrangement 200 (See FIG. 2). For example, shoulder portion 358 may prevent thermal seal 230 from moving relative to composite member 420.

Figure 5:
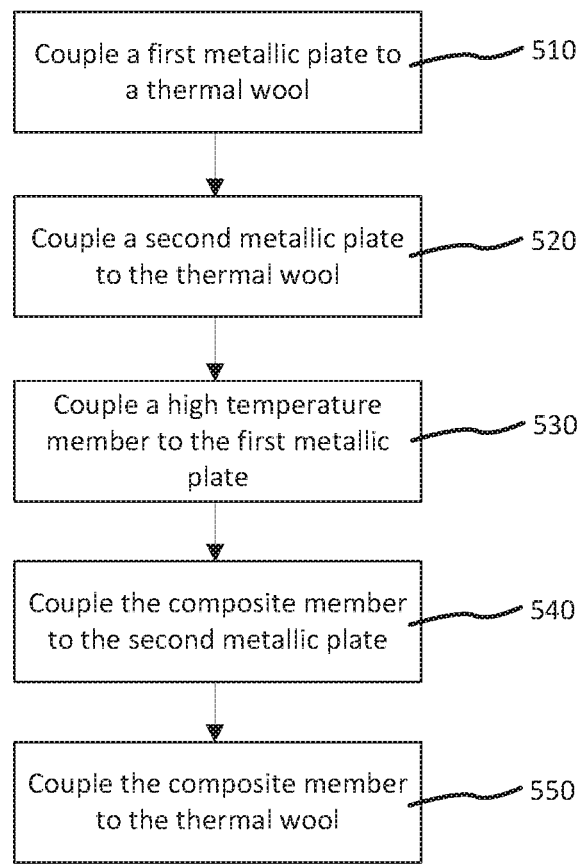
FIG. 5 illustrates method for thermally insulating a high temperature member from a composite member, in accordance with various embodiments.

With reference to FIG. 5, a method 500 for thermally insulating a high temperature member (i.e., duct 70 of FIG. 1) from a composite member is provided, in accordance with various embodiments. Method 500 may include coupling a first metallic plate to a thermal wool, in step 510. Method 500 may include coupling a second metallic plate to the thermal wool, in step 520. Method 500 may include coupling a high temperature member to the first metallic plate, in step 530. Method 500 may include coupling the composite member to the second metallic plate, in step 540. Method 500 may include coupling the composite member to the thermal wool, in step 550.

With additional reference to FIGS. 1-3, step 510 may include coupling first metallic plate 310 to thermal wool 350. Step 520 may include coupling second metallic plate 320 to thermal wool 350. Step 530 may include coupling a high temperature member (i.e., duct 70, via attachment feature 240) to first metallic plate 310. Step 540 may include coupling composite member 220 to second metallic plate 320. Step 550 may include coupling shoulder portion 358 of thermal wool 350 to composite member 220.

In various embodiments, coupling composite member 220 to second metallic plate 320 may include inserting a fastener (i.e., first fastener 242 and/or second fastener 244) into an aperture (i.e., first aperture 332 or second aperture 334).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermal seal comprising:
   a first metallic plate having a first inner surface and a first outer surface;
   a second metallic plate having a second inner surface and a second outer surface, the second metallic plate being oriented substantially parallel to the first metallic plate such that the first inner surface and the second inner surface are separated by a gap; and
   a thermal wool having a plate portion in contact with the first inner surface and the second inner surface, the plate portion filling the gap between the first inner surface and the second inner surface, and having a shoulder portion extending from a perimeter of the plate portion, the shoulder portion extending outward from between the first metallic plate and the second metallic plate, wherein the shoulder portion bends in a direction perpendicular to the first inner surface.

2. The thermal seal of claim 1, wherein the shoulder portion is configured to thermally seal at least a portion of an adjacent component.

3. The thermal seal of claim 1, wherein an aperture is disposed in the thermal seal, the aperture having a centerline axis being substantially perpendicular to the first metallic plate and the second metallic plate.

4. The thermal seal of claim 1, wherein the thermal wool comprises a high temperature mineral wool insulation.

5. The thermal seal of claim 1, wherein the thermal wool comprises a semi-rigid sheet.

6. The thermal seal of claim 1, wherein the first metallic plate and the second metallic plate comprise aluminum.

7. The thermal seal of claim 1, wherein the first metallic plate is coupled to the thermal wool via an adhesive and the second metallic plate is coupled to the thermal wool via the adhesive.

8. The thermal seal of claim 1, wherein a width of the plate portion is substantially equal to a width of the first metallic plate and a length of the plate portion is substantially equal to a length of the first metallic plate.

9. The thermal seal of claim 1, wherein a thickness of the thermal wool is between 100% and 2,000% of a thickness of the first metallic plate.

10. A fan case arrangement comprising:
    a composite fan case;
    a composite member coupled to the composite fan case;

a duct for directing a hot fluid; and
a thermal seal comprising:
- a first metallic plate;
- a second metallic plate; and
- a thermal wool comprising a plate portion and a shoulder portion, the plate portion being located between the first metallic plate and the second metallic plate, the shoulder portion extending from a perimeter of the plate portion and being in contact with the composite member, the shoulder portion extending from between the first metallic plate and the second metallic plate, and the thermal seal being coupled between the composite member and the duct, wherein the shoulder portion bends in a direction perpendicular to the first inner surface of the metallic plate.

11. The fan case arrangement of claim 10, wherein the first metallic plate has the first inner surface and a first outer surface, the second metallic plate has a second inner surface and a second outer surface, the second metallic plate being oriented substantially parallel to the first metallic plate such that the first inner surface and the second inner surface are separated by a gap, and the thermal wool is in contact with the first inner surface and the second inner surface, the thermal wool filling the gap between the first inner surface and the second inner surface.

12. The fan case arrangement of claim 10, wherein a thermal communication between the first metallic plate and the second metallic plate is reduced via the thermal wool.

13. The fan case arrangement of claim 12, wherein the first metallic plate is in thermal communication with the duct and the second metallic plate is in thermal communication with the composite member.

14. The fan case arrangement of claim 10, wherein a first aperture is disposed in the thermal seal, the first aperture having a first centerline axis being substantially perpendicular to the first metallic plate and the second metallic plate and a second aperture is disposed in the thermal seal, the second aperture having a second centerline axis being substantially perpendicular to the first metallic plate and the second metallic plate.

15. The fan case arrangement of claim 14, further comprising an attachment feature for attaching the duct to the composite member, the attachment feature being coupled between the duct and the thermal seal.

16. The fan case arrangement of claim 14, wherein a fastener is located at least partially within at least one of the first aperture or the second aperture to fasten the duct to the composite member.

17. The fan case arrangement of claim 16, wherein the composite member comprises a fan case boss.

18. A method for thermally insulating a high temperature member from a composite member comprising:
- coupling a first metallic plate to a thermal wool, the thermal wool comprising a plate portion and a shoulder portion;
- coupling a second metallic plate to the plate portion of the thermal wool to form a thermal seal, the shoulder portion extending from a perimeter of the plate portion and also extending from between the first metallic plate and the second metallic plate;
- coupling the high temperature member to the first metallic plate; and
- coupling the composite member to the second metallic plate and to the shoulder portion of the thermal wool;
- wherein the first metallic plate comprises a first inner surface and a first outer surface;
- the second metallic plate comprises a second inner surface and a second outer surface, the second metallic plate is oriented substantially parallel to the first metallic plate such that the first inner surface and the second inner surface are separated by a gap;
- the plate portion is in contact with the first inner surface and the second inner surface;
- the plate portion fills the gap between the first inner surface and the second inner surface, and
- the shoulder portion bends in a direction perpendicular to the first inner surface.

19. The method of claim 18, wherein the coupling the composite member to the shoulder portion includes at least partially enclosing a portion of the composite member wherein the second metallic plate is located.

20. The method of claim 18, wherein the coupling the second metallic plate to the plate portion of the thermal wool comprises coupling the second metallic plate to a second surface of the thermal wool, the first metallic plate being coupled to a first surface of the thermal wool, the first surface of the thermal wool and the second surface of the thermal wool being located on opposite sides of the thermal wool.

* * * * *